United States Patent [19]

Su

[11] Patent Number: 4,487,115
[45] Date of Patent: Dec. 11, 1984

[54] TOASTER

[76] Inventor: Cheng-Hsiung Su, No. 63, Fu Te 3rd Rd., Kaohsiung, Taiwan

[21] Appl. No.: 513,251

[22] Filed: Jul. 13, 1983

[51] Int. Cl.³ .............................................. A47J 37/08
[52] U.S. Cl. ........................................ 99/327; 99/391
[58] Field of Search ................ 99/326, 327, 331, 332, 99/334, 335, 385, 391, 393; 426/523

[56] References Cited

U.S. PATENT DOCUMENTS

| | | | |
|---|---|---|---|
| 2,387,817 | 10/1945 | Wales | 99/391 X |
| 2,562,535 | 7/1951 | Leonard | 99/391 X |
| 3,416,430 | 12/1968 | Hauser | 99/391 X |

FOREIGN PATENT DOCUMENTS 151388  9/1920  United Kingdom ................ 99/391

Primary Examiner—Billy J. Wilhite
Attorney, Agent, or Firm—Holman & Stern

[57] ABSTRACT

A toaster comprising a rotating shaft mounted in a toaster case having two openings and covers for the openings, the shaft being mounted for limited rotation and operated by an electromagnetic actuator to move the covers between open and closed positions, each cover provided with a trapezoidal metal net frame for receiving the bread. An electronic circuit system for operating the toaster comprises a timer, temperature switch and triggers to control the heating time and magnetic actuator which drives the rotating shaft to move the covers and bread frames out or in.

3 Claims, 5 Drawing Figures

4,487,115

TOASTER

BACKGROUND OF THE INVENTION

1. Field of the Invention

This invention relates to an electric toaster having a totally enclosing cover to conserve heat and prevent dust from entering and includes bread frames which prevent the bread supported thereon from contacting the electric heating elements and are operated by an electromagnetic actuator. The invention also includes an electronic circuit controlling a timer, the heating element, and the bread frame actuator.

2. Description of the Prior Art

Conventional toasters, as is widely known, are usually filled with the bread from openings in the top. This is inconvenient, and when the bread falls into the frame, it may be inclined and touch the heating elements resulting in scorching. The bread slices also stick in the openings due to bending during toasting and due to over recovery spring force in pop-up toasters, the bread may jump up and land on the table. Valuable heat energy is also wasted through the top openings. In addition, conventional toasters have a bi-metallic heat sensing element to control the bread ejectors which results in different heating times in each use and thus, it is difficult to uniformly control the degree of toasting of the bread. Furthermore, conventional toasters lack a cover for the top openings and therefore, cockroaches, dust and other things can get into the case easily making it less sanitary. The contacts of the heating element power switch may also be damaged due to heavy current passing therethrough when it is opened and closed frequently at short intervals. The above-mentioned defects in manually and mechanically operated conventional toasters are overcome by the electronically controlled automatic operated toaster of this invention.

BRIEF SUMMARY OF THE INVENTION

The present invention provides a toaster with two covers having trapezoidal metal net frames for receiving the bread, the covers being assembled on a rotating shaft mounted on bushings at both ends and controlled by a magnetic actuator to change its position to close or open the cover.

One object of the invention is to totally close the case by frame covers when the toaster is in the heating or storing condition to avoid heat energy loss and prevent dust entering into the interior of the toaster through the two openings which increases efficiency and saves electric power.

Another object of the invention is to provide trapezoidal metal net frames for receiving the bread to prevent the bread from touching the heating elements. Both frames move out or in when a magnetic actuator is energized or de-energized, respectively. The metal frames are below the bread, and thus, the bread can be inserted or removed easily.

The invention also includes an electronic circuit system comprising a timer and two triggers which control the electric power to the heating elements and magnetic actuator, respectively. In addition, a heating timing control circuit is provided to assure the desired heating time period for each use. A temperature controlled switch turns on the timer to the heating time whenever the toaster is to be warmed up to a selected temperature (say 100° C. or 212° F). A time adjusting knob is installed on the case to set the heating period which depends on the preferred taste.

BRIEF DESCRIPTION OF THE DRAWINGS

The present invention will now be described with greater clarity and specificity with reference to the accompanying drawings wherein.

DESCRIPTION OF A PREFERRED EMBODIMENT OF THE INVENTION

Figure 1:
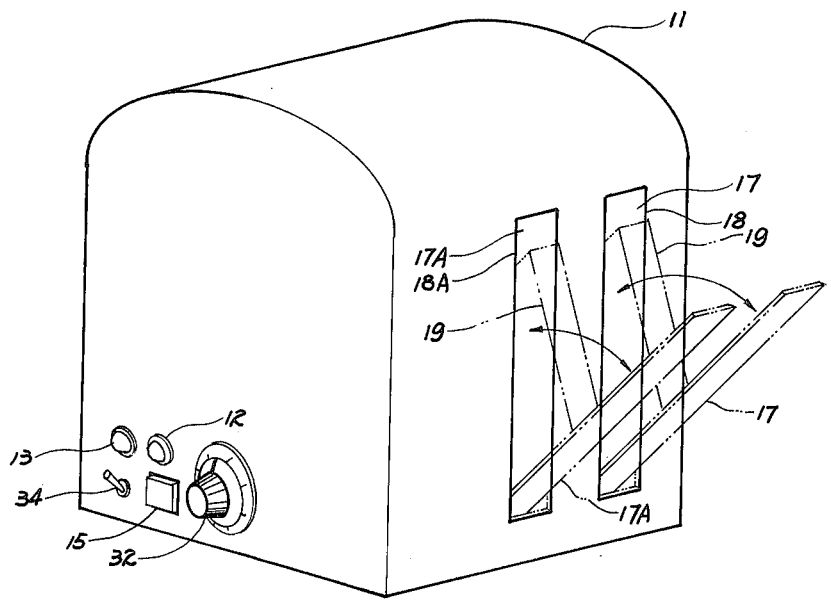
FIG. 1 is a perspective view of the toaster of the present invention.
Figure 5:
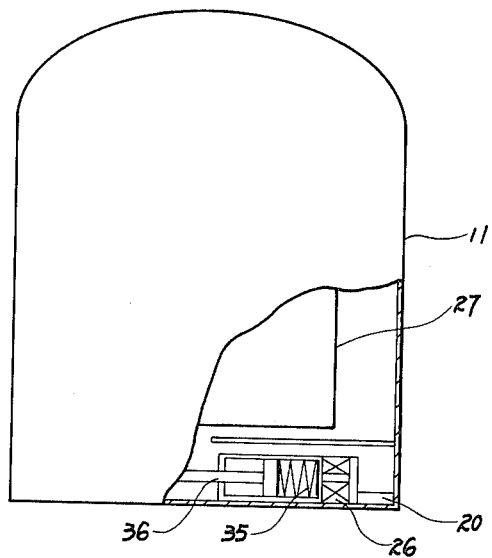
FIG. 5 is a cut-away side elevational view showing part of the present invention.

As shown in the drawings, the present invention comprises the toaster case 11, electronic circuit system 20, rotating shaft 39 and magnetic actuator 26.

Figure 4:
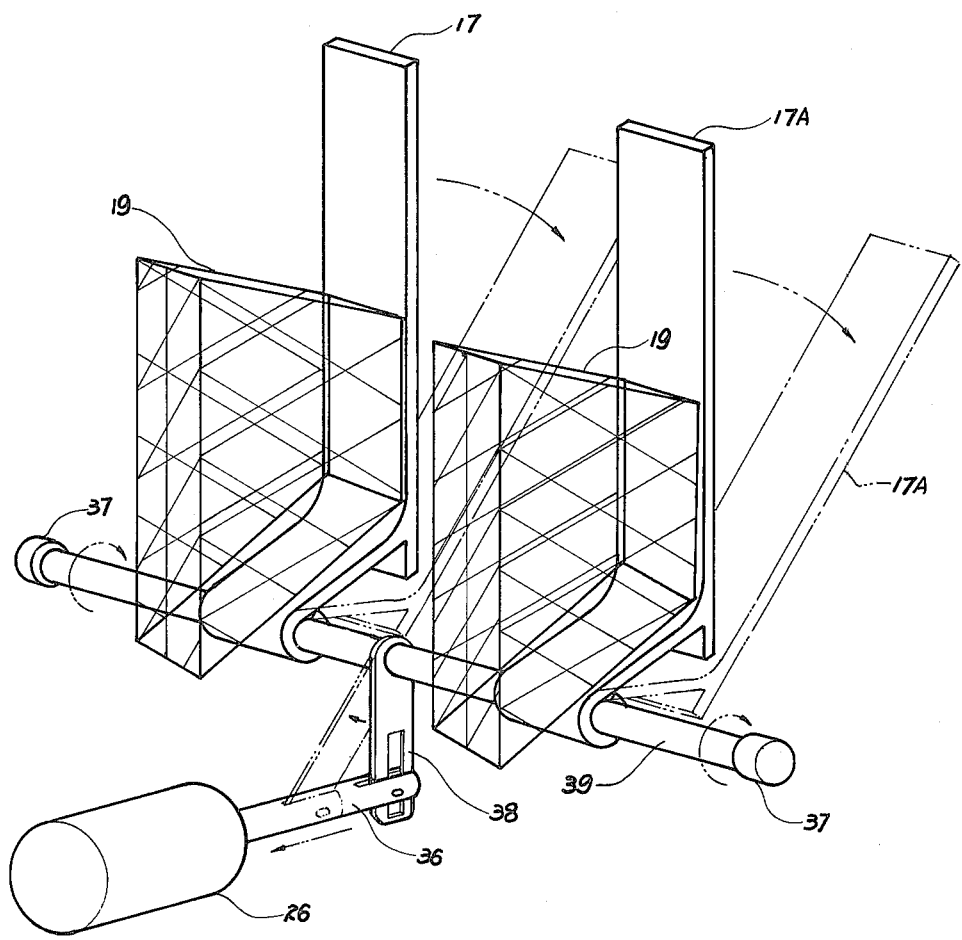
FIG. 4 is a perspective view of the rotating shaft and covers after being assembled.

FIG. 1 shows two openings 18, 18A located on the right hand side of the case 11 covered by two covers 17, 17A, respectively, LED indicators 12, 13, touch control switch 15 and time adjusting knob 32. Each cover 17, 17A is provided with a trapezoidal metal net frame 19 (see FIG. 4) having a width smaller than the covers 17, 17A and a length and width larger than a slice of bread. Thus, the bread does not swing or become unbalanced when it is inserted into the metal frame 19, and is always held within the net-frame oven if it undergoes bending after being heated, and there is no problem in moving the bread out of the case. The height of the frame is about one inch above the bread so that it is convenient to load and unload the bread. Furthermore, the covers 17, 17A are assembled onto a rotating shaft 39 (please see FIG. 4) which is mounted in two bushings 37, the bushings being fixed on the case base. Shaft 39 is also connected to the stem 36 of the magnetic actuator 26 by the connecting arm 38. By means of the magnetic actuator 26 engaging the arm 38, the shaft 39 is rotated in the clockwise or counterclockwise direction to thus open or close the covers 17, 17A.

Figure 2:
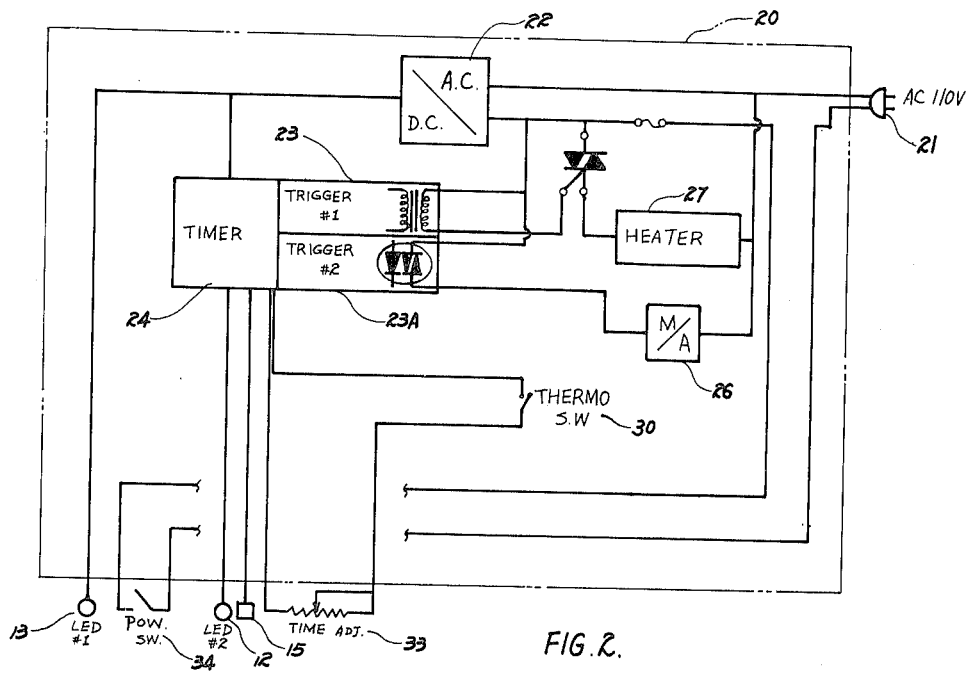
FIG. 2 is a schematic diagram of the electronic control system of the present invention.
Figure 3:
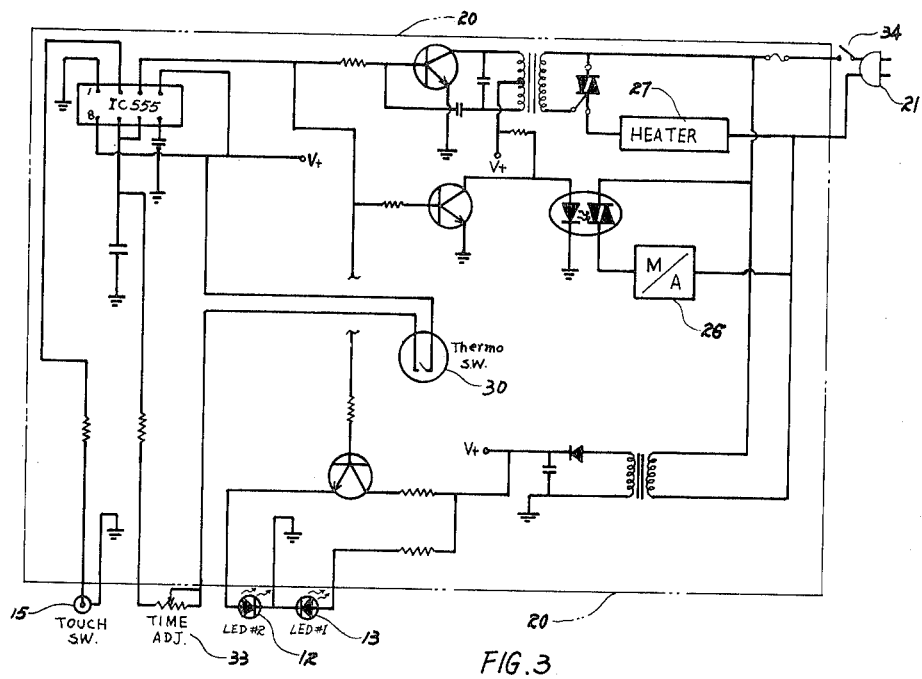
FIG. 3 is a detailed schematic diagram of the electronic circuit of the present invention.

Referring to FIG. 2, the internal bottom portion of the case 11 is provided with an electronic circuit system 20 which includes timer 24, thermoswitch 30, two triggers 23, 23A, TRIAC 25 and magnetic actuator 26. As shown in FIG. 2, the electric power source input 21 to the system 20 is through power switch 34, and a rectifier 22 to supply D.C. voltage for the control circuit. A thermoswitch 30 is provided to sense the oven temperature and when its temperature reaches 212° F., it turns on the timer 24 to count or control the heating time. The timing is set by variable resister 33.

The aforedescribed toaster is assembled by a novel technique and the operation of the present invention is as follows:

1. When the power source input 21 is connected to the electronic circuit system, the LED 13 lights up and the magnetic actuator 26 is energized to move the covers 17, 17A out into the open position ready to load the bread.

2. After the bread is loaded, switch 15 is operated so that the trigger 23A turns off and magnetic actuator 26 is de-energized, thereby closing the covers 17, 17A. Also, the trigger 23 turns the TRIAC 25 on, then turns on the heater power and the heating indicator LED 12 also lights up. When the oven temperature reaches the temperature set by the temperature switch 30, it turns the timer 24 on to start counting the time until the set time of the timer is reached and then the heater power is turned off, the indicator LED 12 is also turned off and the magnetic actuator 26 is again energized to open the covers 17, 17A to unload the bread.

I claim:

1. An electric toaster to uniformaly toast bread comprising:

a hollow case;

heating elements within said case;

two openings through the side of said case;

a cover for each opening;

a shaft rotatably mounted on said case and attached to said covers so that rotation of said shaft moves said covers between open and closed positions;

trapezoidal metal frames for receiving and holding slices of bread mounted on said covers so that when said covers are open said frames are disposed outside said case and when said covers are closed said frames are disposed within said case adjacent said heating elements;

an electromagnetic actuator operatively connected to said shaft to selectively rotate said shaft when energized to move said covers into the open or closed positions; and an electronic circuit system for automatically controlling the heating time and toasting comprising, a connector to a power source, a touch control switch mounted to the case and operatively connected between said power source connector and said heating elements to energize said heating elements, a timer operatively connected in the heating element circuit to control the time of energization of said heating elements, a time adjustment means operatively connected in the timer circuit to selectively set the operation of the timer, and a thermal actuated switch operatively connected in the timer circuit to energize the timer at a pre-set temperature, said electromagnetic actuator being operatively connected in said timer circuit to be operated thereby.

2. A toaster as claimed in claim 1 and further comprising:

two triggers; and a TRIAC;

one of said triggers being operatively connected in the circuit to control the TRIAC which is in the heater circuit, and the other trigger being operatively connected in the circuit of the electromagnetic actuator, to control the input from the power source to the heating elements and said electromagnetic actuator, respectively.

3. A toaster as claimed in claim 1 wherein said timer adjustment means comprises a variable resistor.

* * * * *